(12) United States Patent
Liao et al.

(10) Patent No.: US 11,567,352 B2
(45) Date of Patent: Jan. 31, 2023

(54) DISPLAY MODULE, PREPARATION METHOD THEREOF, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Chuandong Liao, Beijing (CN); Liqiang Chen, Beijing (CN); Mengyuan Pang, Beijing (CN); Yaming Wang, Beijing (CN); Yanxin Wang, Beijing (CN); Dongdong Zhao, Beijing (CN)

(73) Assignees: Chengdu BOE Optoelectronics Technology Co., Ltd., Sichuan (CN); BOE Technology Group Co., Ltd,., Beijing (CN)

( * ) Notice: Subject to any disclaimer, the term of this patent is extended or adjusted under 35 U.S.C. 154(b) by 0 days.

(21) Appl. No.: 17/486,802

(22) Filed: Sep. 27, 2021

(65) Prior Publication Data
US 2022/0244579 A1    Aug. 4, 2022

(30) Foreign Application Priority Data
Jan. 29, 2021   (CN) .......................... 202110126839.X

(51) Int. Cl.
*G02F 1/01*    (2006.01)
*G02F 1/1335*  (2006.01)
*G02F 1/1333*  (2006.01)

(52) U.S. Cl.
CPC ...... *G02F 1/0126* (2013.01); *G02F 1/133331* (2021.01); *G02F 1/133512* (2013.01);
(Continued)

(58) Field of Classification Search
CPC ......... G02F 1/133331; G02F 1/133512; G02F 2201/50; G02F 2202/28; G02F 1/136209;
(Continued)

(56) References Cited

U.S. PATENT DOCUMENTS

2019/0317629 A1*  10/2019  Jung ..................... G06F 3/0488
2020/0285123 A1*   9/2020  Kim ................... G02F 1/133331
(Continued)

FOREIGN PATENT DOCUMENTS

| CN | 108681131 A | * 10/2018 | ........... G02F 1/1333 |
| CN | 109100892 A | 12/2018 | |
| CN | 111443774 A | * 7/2020 | ........... G06F 1/1637 |

*Primary Examiner* — Jia X Pan
(74) *Attorney, Agent, or Firm* — IPro, PLLC

(57) ABSTRACT

The present application discloses a display module, a preparation method thereof, and a display apparatus. In a non-display region of the display panel, the display panel and the optical adhesive have a first open pore and a second open pore penetrating through their thickness, respectively; and an orthographic projection of the first open pore falls in an orthographic projection of the second open pore on the cover plate. A light shading part in the light shading region has a third open pore surrounding the light transmitting region; and the light shading part includes a photochromic material in a light shading state, and an orthographic projection of the light shading part on the cover plate at least covers a region, which does not overlap with the orthographic projection of the first open pore on the cover plate, of the orthographic projection of the second open pore on the cover plate.

15 Claims, 7 Drawing Sheets

(52) U.S. Cl.
CPC ...... *G02F 2201/50* (2013.01); *G02F 2202/04* (2013.01); *G02F 2202/28* (2013.01)

(58) Field of Classification Search
CPC ............... H04N 5/2257; H04M 1/0264; H01L 27/3272; H01L 51/5246
See application file for complete search history.

(56) References Cited

U.S. PATENT DOCUMENTS

2021/0118962 A1* 4/2021 Shin .................... H01L 27/3232
2021/0200020 A1* 7/2021 Kim .................. G02F 1/133331

* cited by examiner

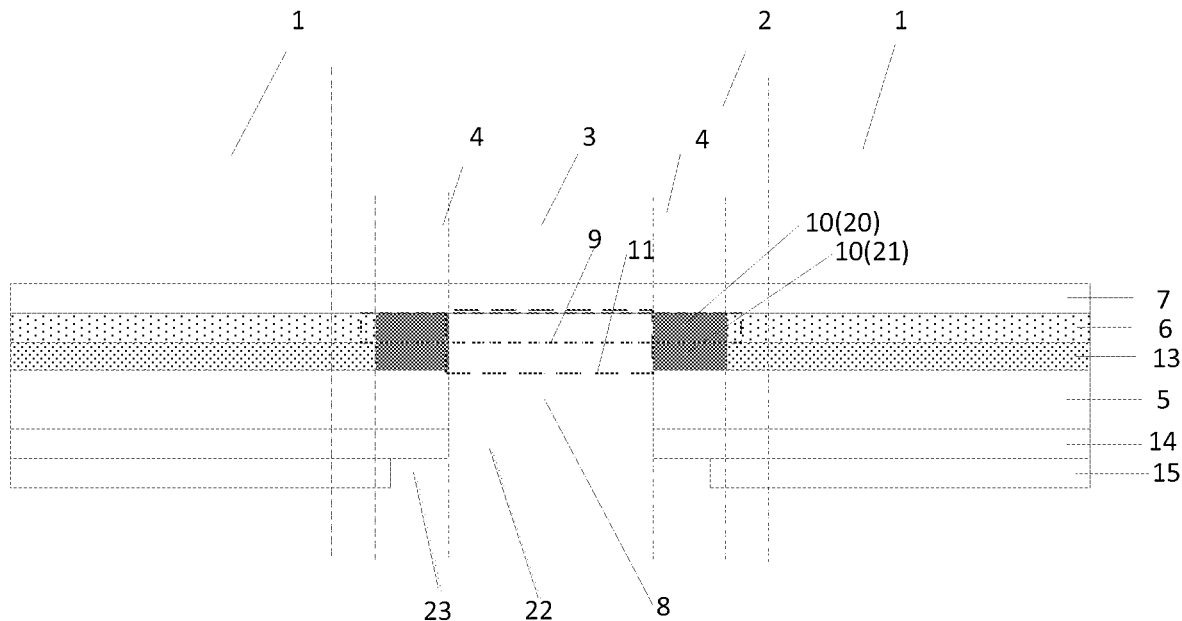

FIG. 5

Preparing a display panel, and forming an optical adhesive on a light emergent side of the display panel — S101

In a first non-display region, forming a first open pore penetrating through a thickness of the display panel, and forming a second open pore penetrating through a thickness of an optical adhesive; bonding a cover plate with the optical adhesive, and forming a light shading part in the light shading region — S102

DISPLAY MODULE, PREPARATION METHOD THEREOF, AND DISPLAY APPARATUS

CROSS REFERENCE TO RELATED APPLICATIONS

The present disclosure claims priority to Chinese Patent Application No. 202110126839.X filed with the China National Intellectual Property Administration on Jan. 29, 2021, the entire contents of which are incorporated herein by its reference.

FIELD

The present application relates to the field of display technology, in particular to a display module, a preparation method thereof, and a display apparatus.

BACKGROUND

In recent years, a screen-to-body ratio of electronic products is provided with become a technical problem focused by research personnel. A placing position of a front camera plays a key role in screen-to-body ratio. From a notch screen to a lifting camera, and then to a perforated screen, all kinds of technologies emerge in endlessly. The perforated screen serves as a reliable technical solution which is gradually adopted by many developers.

SUMMARY

Embodiments of the present application provide a display module, a preparation method thereof, and a display apparatus, which are configured to avoid light leakage of an edge of a light transmitting region.

A display module provided by the embodiment of the present application, includes: a display region, and at least one first non-display region in the display region; and the first non-display region includes: a light transmitting region, and a light shading region between the display region and the light transmitting region;

a display panel, provide with a first open pore penetrating through its thickness in the first non-display region;

a cover plate on a light emergent side of the display panel, and an optical adhesive between the cover plate and the display panel, provided with a second open pore penetrating through its thickness in the first non-display region, wherein an orthographic projection of the first open pore on the cover plate is located in an orthographic projection of the second open pore on the cover plate; and a light shading part in the light shading region, wherein the light shading part is provided with a third open pore surrounding the light transmitting region and comprises a photochromic material in a light shading state, and an orthographic projection of the light shading part on the cover plate at least covers a region, which does not overlap with the orthographic projection of the first open pore on the cover plate, of the orthographic projection of the second open pore on the cover plate.

In some embodiments, the light shading part includes:

an ink layer located on one side of the cover plate facing the optical adhesive, and a first photochromic material layer at least coated on one side of the display panel and the optical adhesive proximate to the light transmitting region;

wherein the ink layer is provided with an opening region, an orthographic projection of the opening region on the cover plate coincides with an orthographic projection of the light transmitting region on the cover plate, the orthographic projection of the opening region on the cover plate is located in the orthographic projection of the first open pore on the cover plate, and an edge of the orthographic projection of the second open pore on the cover plate is located in an edge, away from the light transmitting region, of an orthographic projection of the ink layer on the cover plate.

In some embodiments, the display panel further includes:

a second photochromic material layer on one side of the ink layer facing the optical adhesive;

wherein the second photochromic material layer and the first photochromic material layer are of an integrated structure, and the second photochromic material layer covers the opening region and the ink layer in the second open pore; and a part of the second photochromic material layer covering the opening region is in a transparent state, and the remaining part of the second photochromic material layer is in a light shading state.

In some embodiments, the light shading part includes a part of the optical adhesive extending to the light shading region and doped with the photochromic material; wherein the photochromic material doped in the optical adhesive in the light shading region is in a light shading state.

In some embodiments, the optical adhesive is only doped with the photochromic material in the light shading region.

In some embodiments, the optical adhesive is entirely doped with the photochromic material; and the photochromic material in a region outside the light shading region is in a transparent state.

In some embodiments, the display module further includes:

an optical film between the optical adhesive and the display panel;

wherein the light shading part further includes: a part of the optical film extending to the light shading region and doped with the photochromic material; and the photochromic material doped in the optical film in the light shading region is in a light shading state; and an orthographic projection of the part of the optical film extending to the light shading region and doped with the photochromic material on the cover plate coincides with an orthographic projection of the part of the optical adhesive extending to the light shading region and doped with the photochromic material on the cover plate.

In some embodiments, the optical film is entirely doped with the photochromic material; and the photochromic material in a region except for the light shading region is in a transparent state.

In some embodiments, an orthographic projection of the third open pore on the cover plate coincides with the orthographic projection of the first open pore on the cover plate, and the orthographic projection of the first open pore on the cover plate coincides with the orthographic projection of the light transmitting region on the cover plate.

In some embodiments, the display module further includes:

a backing film on one side of the display panel facing away from the optical film, and a heat dissipating layer on one side of the backing film facing away from the display panel;

in the first non-display region, the backing film is provided with a fifth open pore penetrating through its thickness, and the heat dissipating layer is provided with a sixth open pore penetrating through its thickness; and the orthographic projection of the first open pore on the cover plate coincides with an orthographic projection of the fifth open pore on the cover plate, and the orthographic projection of the second open pore on the cover plate is located in an orthographic projection of the sixth open pore on the cover plate.

A preparation method of a display module provided by an embodiment of the present application, includes:

preparing a display panel and forming an optical adhesive on a light emergent side of the display panel, wherein the display module includes a display region, and at least one first non-display region in the display region; and the first non-display region includes: a light transmitting region, and a light shading region between the display region and the light transmitting region; and forming a first open pore penetrating through a thickness of the display panel in the first non-display region, forming a second open pore penetrating through a thickness of the optical adhesive in the first non-display region, attaching a cover plate and the optical adhesive, and forming a light shading part in the light shading region, wherein an orthographic projection of the first open pore on the cover plate is located in an orthographic projection of the second open pore on the cover plate; the light shading part is provided with a third open pore surrounding the light transmitting region; and the light shading part includes a photochromic material in a light shading state, and an orthographic projection of the light shading part on the cover plate at least covers a region, which does not overlap with the orthographic projection of the first open pore on the cover plate, of the orthographic projection of the second open pore on the cover plate.

In some embodiments, the forming the light shading part in the light shading region, specifically includes:

before attaching the cover plate and the optical adhesive, forming an ink layer on one side of the cover plate and in the first non-display region, wherein the ink layer is provided with an opening region, an orthographic projection of the opening region on the cover plate coincides with an orthographic projection of the light transmitting region on the cover plate, the orthographic projection of the opening region on the cover plate is located in the orthographic projection of the first open pore on the cover plate, and an edge of the orthographic projection of the second open pore on the cover plate is located in an edge, away from the light transmitting region, of an orthographic projection of the ink layer on the cover plate;

after attaching the cover plate and the optical adhesive, forming a first photochromic material layer and a second photochromic material layer of an integrated structure by coating a photochromic material on one side of the display panel and the optical adhesive proximate to the light transmitting region, the ink layer in the second open pore and the opening region of the ink layer by adopting a spraying process, wherein the photochromic material is in a light shading state when not being irradiated by a preset illumination condition, the first photochromic material layer covers one side of the display panel and the optical adhesive proximate to the light transmitting region, and the second photochromic material layer coats and covers the opening region of the ink layer and the ink layer in the second open pore; and performing ultraviolet irradiation on the photochromic material covering the opening region of the ink layer by taking a pattern of the ink layer as a mask so as to enable the photochromic material covering the opening region of the ink layer to change from the light shading state to a transparent state.

In some embodiments, the preparation method further includes:

forming the optical adhesive doped with the photochromic material, and forming an optical film doped with the photochromic material, wherein the optical adhesive and the optical film at least in the light shading region are doped with the photochromic material; and the doped photochromic material in the light shading region is in a transparent state;

wherein the forming the optical adhesive on the light emergent side of the display panel, includes:

attaching the optical film on the light emergent side of the display panel; and forming the optical adhesive on one side of the optical film facing away from the display panel; and the forming the second open pore penetrating through the thickness of the optical adhesive and the forming the light shading part in the light shading region, include:

removing the optical adhesive and the optical film at the light transmitting region, and performing irradiation on the light shading region and the light transmitting region by a preset illumination, so as to make the photochromic material doped in the optical adhesive and the optical film in the light shading region be in a light shading state, and make the second open pore.

In some embodiments, before forming the optical adhesive, the method further includes:

attaching the optical film on one side of the light emergent face of the display panel, wherein the optical film at least in the light shading region is doped with the photochromic material, and the photochromic material doped in the optical film in the light shading region is in the transparent state;

wherein the forming the optical adhesive on the light emergent side of the display panel, includes:

coating the optical adhesive on one side of the optical film facing away from the display panel;

at the same time of forming the first open pore penetrating through the thickness of the display panel at the first non-display region, and forming the second open pore penetrating through the thickness of the optical adhesive, the method further includes:

removing the optical film at the light transmitting region.

The method further includes:

removing the optical film at the light transmitting region while removing the optical adhesive at the light transmitting region, and making the photochromic material doped in the optical film in the light shading region be in the light shading state while irradiating the light shading region and the light transmitting region by adopting the preset illumination condition, so as to form a light-shading optical film, wherein an orthographic projection of the light-shading optical film on the cover plate coincides with an orthographic projection of a light-shading optical adhesive on the cover plate.

A display apparatus provided by an embodiment of the present application, includes: the display module provided by the embodiment of the present application, and a photosensitive element, wherein the photosensitive element is located in a light transmitting region.

BRIEF DESCRIPTION OF THE DRAWINGS

In order to illustrate the technical solutions in the embodiments of the present application more clearly, accompanying drawings needing to be used in description of the embodiments will be introduced below briefly. It is apparent that the drawings in the description below are some embodiments of the present application, and those skilled in the art can further obtain other drawings according to these drawings without inventive efforts.

FIG. 5 is a schematic structural diagram of further another display module provided by an embodiment of the present application.

FIG. 6 is a schematic diagram of a preparation method of a display module provided by an embodiment of the present application.

DETAILED DESCRIPTION OF THE EMBODIMENTS

Figure 1:
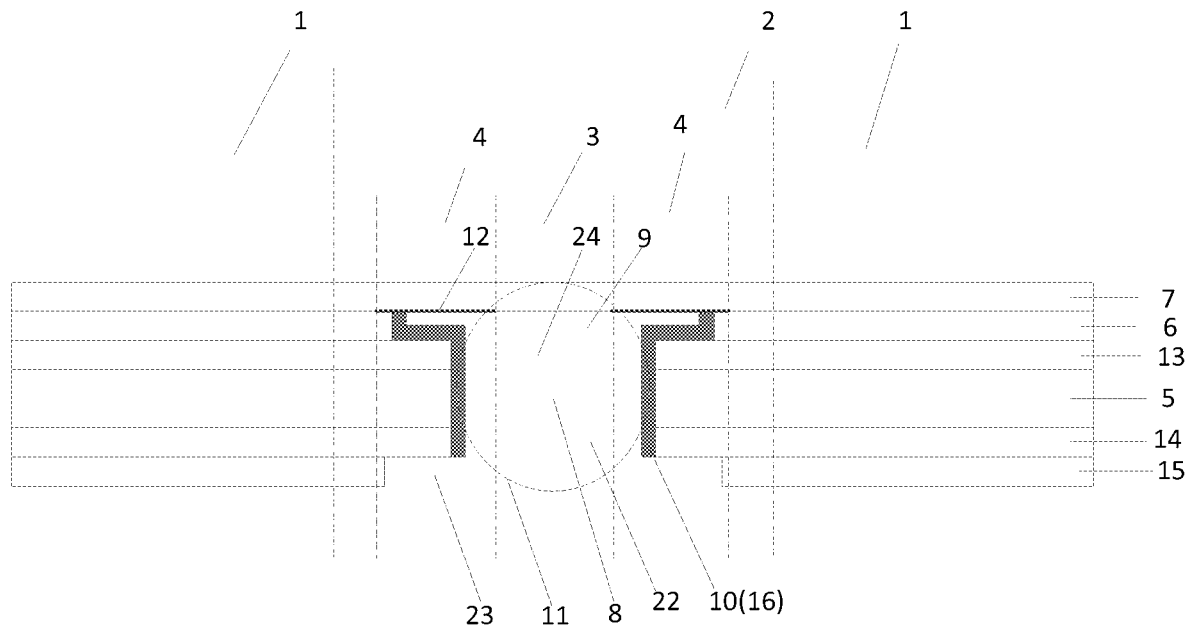
FIG. 1 is a schematic structural diagram of a display module provided by an embodiment of the present application.

In order to make the objective, technical solutions and advantages of the embodiments of the present application more clear, the technical solutions of the embodiments of the present application will be described clearly and completely with reference to the drawings of the embodiments of the present application. It is apparent that the described embodiments are part of the embodiments of the present application, but not all the embodiments. The embodiments in the present application and features in the embodiments may be mutually combined in the case of no conflict. On the basis of the described embodiments of the present application, all other embodiments obtained by those skilled in the art without inventive efforts fall within the protection scope of the present application.

Unless otherwise defined, the technical or scientific terms used in the present application should have the usual meanings understood by those skilled in the art to which the present application belongs. The words "first", "second" and the like used in the present application do not indicate any order, quantity or importance, but are only used to distinguish different components. The word "including" or "comprising" and the like, means that an element or item preceding the word comprises an element or item listed after the word and the equivalent thereof, without excluding other elements or items. The word "connection" or "coupling" and the like is not restricted to physical or mechanical connection, but may include electrical connection, whether direct or indirect.

It should be noted that the size and shapes of all graphs in the drawings do not reflect the true scale, and only intend to illustrate the content of the present application. The same or similar reference numbers represent the same or similar elements or elements with the same or similar functions from beginning to end.

In the solution of the related art, edges of a camera and a hole in display screen are usually filled with black ultraviolet curing adhesive (UV adhesive). However, ultraviolet irradiation curing needs to be considered for the black UV adhesive, and therefore, its blackness cannot be excessive, which cannot meet a light shading requirement and will have a problem of light leakage from the edges. In addition, in the related art, a UV adhesive gluing process is usually adopted to form a sealant. Some gaps still exist between an adhesive layer formed by the process and the display screen, consequently resulting in poor attaching effect between the UV adhesive and the display screen. Moreover, the UV adhesive layer formed by the gluing process is excessive in thickness, resulting in increase of black edges around the camera, and decreasing the screen-to-body ratio.

Figure 2:
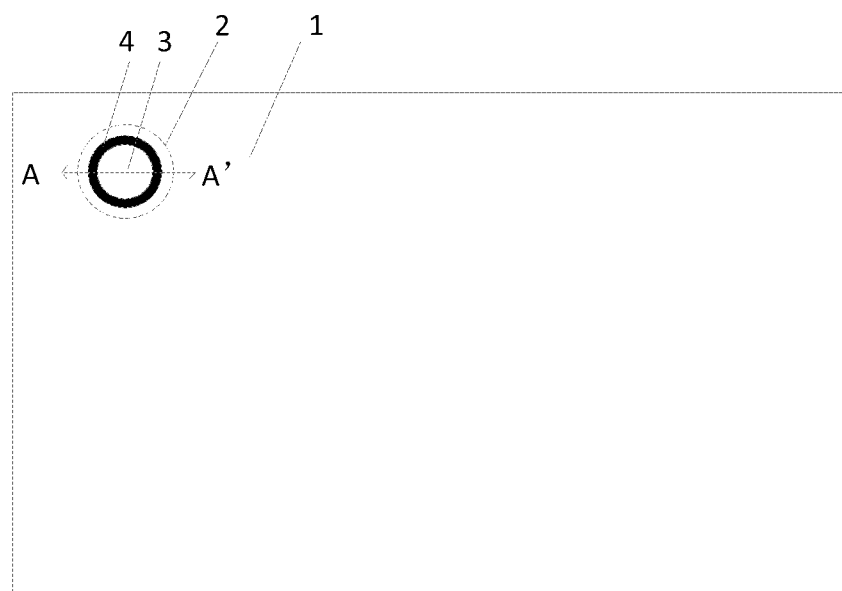
FIG. 2 is a schematic structural diagram of another display module provided by an embodiment of the present application.

An embodiment of the present provides a display module, as shown in FIGS. 1 and 2, wherein FIG. 1 is, for example, a sectional view along AA' in FIG. 2. The display module includes: a display region 1, and at least one first non-display region 2 in the display region 1; and the first non-display region 2 includes: a light transmitting region 3, and a light shading region 4 between the display region 1 and the light transmitting region 3;

the display module includes: a display panel 5, a cover plate 7 on a light emergent side of the display panel 5, and an optical adhesive 6 between the cover plate 1 and the display panel 5;

in each first non-display region 2, the display panel 5 is provided with a first open pore 8 penetrating through its thickness, and the optical adhesive 6 is provided with a second open pore 9 penetrating through its thickness; and an orthographic projection of the first open pore 8 on the cover plate 7 is located in an orthographic projection of the second open pore 9 on the cover plate 7; and the display module further includes: a light shading part 10 in the light shading region 4, and the light shading part 10 is provided with a third open pore 11 surrounding the light transmitting region 3; and the light shading part 10 includes a photochromic material in a light shading state, and an orthographic projection of the light shading part 10 on the cover plate 7 at least covers a region, which does not overlap with the orthographic projection of the first open pore 8 on the cover plate, of the orthographic projection of the second open pore 9 on the cover plate.

It should be noted that the light emergent side of the display panel is one light-emitting side of the display panel under a normal display state, that is, the side faced by a display face. If there is a light leakage situation on one side of the display panel facing away from the display face, a light leakage side does not belong to the light emergent side of the display panel.

It should be noted that, in a display product, a region corresponding to the light transmitting region of the display module usually needs to be provided with a photosensitive element such as a camera. In the related art, when an edge of the light transmitting region leaks light, induction light rays of the camera are affected, thereby affecting an imaging effect.

During specific implementation, the photochromic material may be subjected to a chemical reaction under a preset illumination condition, so that a color of the material is changed. The preset illumination condition may be, for example, ultraviolet irradiation. For example, the photochromic material is dark (such as black) or transparent before light irradiation. After being subjected to ultraviolet irradiation, dye in the photochromic material is combined with ultraviolet light to make the material to be subjected to metachromatism to change from black to transparence, or change from transparence to black.

According to the display module provided by the present application, the light shading part includes the photochromic material, and the photochromic material may be black and may exert a good light shading effect. The light shading part surrounds the light transmitting region, that is, the light shading part may perform light shading on a side surface of the light transmitting region so as to prevent light of the display product from being intervened with the photosensitive element, thereby avoiding light leakage of the edge of the light transmitting region caused by the fact that a UV adhesive needs to consider that ultraviolet irradiation blackness cannot be excessive, and improving an imaging effect of the photosensitive element of the display product. Moreover, the orthographic projection of a via hole of the display panel on the cover plate falls in the orthographic projection of the second open pore of the optical adhesive on the cover plate, that is, an area of the second open pore is greater than that of the first open pore. That is, compared with the display panel, the optical adhesive is provided with an inward-sunken structure in the light shading region, the orthographic projection of the light shading part on the cover plate at least covers the region, which does not overlap with the orthographic projection of the first open pore on the cover plate, of the orthographic projection of the second open pore on the cover plate, and the light shading part makes contact with the optical adhesive at the inward-sunken structure, thereby improving a bonding effect of a light shading layer and a side surface of the via hole, and further improving the light shading effect of the light shading layer.

It should be noted that FIG. 2 is illustrated by taking an example that the display module includes one first non-display region. During specific implementation, it may be set according to actual demand.

In some embodiments, the photochromic material is in a light shading state, for example, a light transmittance of the photochromic material is less than 5%.

During specific implementation, the photochromic material may be, for example, materials such as stilbene, spiro, norbornadiene, fulgide, triphenylmethane derivatives, and salicylanilide compounds.

In some embodiments, the display panel provided by the embodiment of the present application is a liquid crystal display panel.

Certainly, the display panel may also be an electroluminescent display panel. The electroluminescent display panel is, for example: an Organic Light-Emitting Diode (OLED) display panel, or a Quantum Dot Light Emitting Diode (QLED) display panel, etc.

In some embodiments, as shown in FIG. 1, the light shading part 10 includes: an ink layer 12 on one side of the cover plate 7 facing the optical adhesive 6, and a first photochromic material layer 16 at least coated on one side of the display panel 5 and the optical adhesive 6 proximate to the light transmitting region; and the ink layer 12 is provided with an opening region, an orthographic projection of the opening region on the cover plate 7 coincides with an orthographic projection of the light transmitting region 3 on the cover plate 7, the orthographic projection of the opening region on the cover plate 7 is located in the orthographic projection of the first open pore 8 on the cover plate 7, and an edge, away from the light transmitting region 3, of the orthographic projection of the second open pore 9 on the cover plate is located in an edge of an orthographic projection of the ink layer 12 on the cover plate 7.

In some embodiments, the light transmittance of the photochromic material is less than 5%, that is, a light transmittance of the first photochromic material layer is less than 5%.

During specific implementation, the photochromic material in the first photochromic material layer is in a light shading state. For example, the light transmittance of the first photochromic material layer is made to be less than 5% so as to exert the good light shading effect, thereby avoiding light leakage from the edge of the light transmitting region caused by the fact that the UV adhesive needs to consider that ultraviolet irradiation blackness cannot be excessive, and improving the imaging effect of the photosensitive element of the display product.

During specific implementation, the photochromic material in the first photochromic material layer is in the light shading state. For example, the photochromic material may be not irradiated under the present illumination condition to be in the light shading state, that is, the light shading layer including the photochromic material does not need to be illuminated, and the first photochromic material layer may have the low light transmittance and thus have the light shading effect. Or the photochromic material may be not irradiated under the present illumination condition to be in a transparent state, the photochromic material is irradiated under the present illumination condition so as to be in the light shading state, so that the light shading layer is provided with the light shading function.

During specific implementation, the ink layer can avoid light leakage of the light transmitting region caused by refraction of all film layers of the display module.

Figure 3:
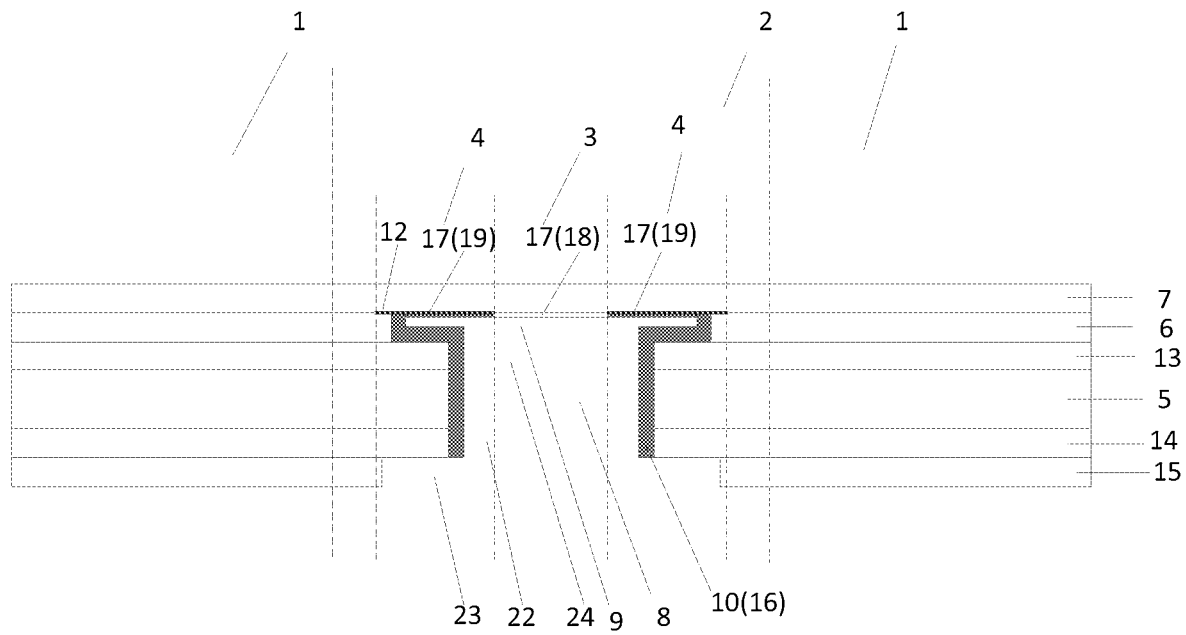
FIG. 3 is a schematic structural diagram of further display module provided by an embodiment of the present application.

In some embodiments, as shown in FIG. 3, the display module further include: a second photochromic material layer 17 on one side of the ink layer 6 facing the optical adhesive 6;

the second photochromic material layer 17 and the first photochromic material layer 16 are of an integrated structure, and the second photochromic material layer 17 covers the opening region of the ink layer 12 and the ink layer 12 in the second open pore 9; and a part 18, covering the opening region of the ink layer 12, of the second photochromic material layer 17 is in a transparent state, and the remaining part of the second photochromic material layer 17 is in a light shading state.

In some embodiments, the transparent state may be, for example, a light transmittance of the film layer is greater than 93%, that is, the light transmittance of the part of the second photochromic material layer covering the opening region of the ink layer is greater than 93%.

According to the display module provided by the embodiment of the present application, the photochromic material layers are disposed on the side surfaces of the via holes of the respective film layers and surfaces perpendicular to the via holes so as to form the first photochromic material layer and the second photochromic material layer which are of an integrated structure. Only a region of the second photochromic material layer covering the opening region of the ink layer is in the transparent state, the part in the light shading state of the second photochromic material layer is connected with the first photochromic material layer, thereby further improving the light shading effect, and effectively avoiding the light leakage of the edge of the light transmitting region.

In addition, it should be noted that during specific implementation, the first photochromic material layer and the second photochromic material layer may be formed in the same process. In this way, the second photochromic material layer is disposed to avoid the problem of excessive coating caused by only disposing the first photochromic material layer, that is, the photochromic material may be prevented from being coated to a non-light-shading region due to the process. By disposing the first photochromic material layer and the second photochromic material layer, the coating precision requirement of the photochromic material can be reduced. Even if the second photochromic material layer is coated at the light transmitting region, the second photochromic material layer may further be irradiated subsequently to be in the transparent state, thereby avoiding affecting a light transmitting effect of the light transmitting region.

In some embodiments, for example, a spraying process may be adopted to coat the photochromic material so as to form the first photochromic material layer and the second photochromic material layer which are of the integrated structure. Compared with a sealant coating in the related art, the thinner photochromic material layer may be formed so that a larger size of a black edge around the light transmitting region can be avoided without increasing a size of the first non-display region, thereby increasing a size of the light transmitting region, reserving a larger assembly space for the photosensitive element, and increasing a ratio of a non-pore region of the display panel.

In some embodiments, as shown in FIGS. 1 and 3, the display module further includes: an optical film 13 between the optical adhesive 6 and the display panel 5, a backing film 14 on one side of the display panel 5 facing away from the optical film 13, and a heat dissipating layer 15 on one side of the backing film 14 facing away from the display panel 5.

In the first non-display region 2, the optical film 13 is provided with a fourth open pore 24 penetrating through its thickness, the backing film 14 is provided with a fifth open pore 22 penetrating through its thickness, and the heat dissipating layer 15 is provided with a sixth open pore 23 penetrating through its thickness; and orthographic projections of the first open pore 8, the fourth open pore 24 and the fifth open pore 22 on the cover plate 7 coincide, and the orthographic projection of the second open pore 9 on the cover plate 7 is located in an orthographic projection of the sixth open pore 23 on the cover plate 7.

The first photochromic material layer 16 is coated on side surfaces of the backing film 14, the display panel 5, the optical film 13 and the optical adhesive 6 proximate to the light transmitting region.

In some embodiments, as shown in FIGS. 1 and 3, the optical film 13 includes a polarizer.

In some embodiments, in a direction parallel to a plane where the display panel is located, a thickness of the first photochromic material layer is greater than 0 and smaller than 0.3 mm. It should be noted that the thickness of the first photochromic material layer refers to a distance between one side surface of the first photochromic material layer proximate to the light transmitting region and one side surface of the backing film or the display panel or the optical film or the optical adhesive proximate to the light transmitting region.

In this way, the thickness of the first photochromic material layer may be avoided from being too thick. Moreover, because an assembly distance needs to be reserved between an edge of the light shading region adjacent to the light transmitting region of the display product and the disposed photosensitive element, the thickness of the first photochromic material layer is greater than 0 and smaller than 0.3 mm, thereby avoiding affecting subsequent assembly of the camera.

Or, the light shading part may also adopt other disposing modes.

Figure 4:
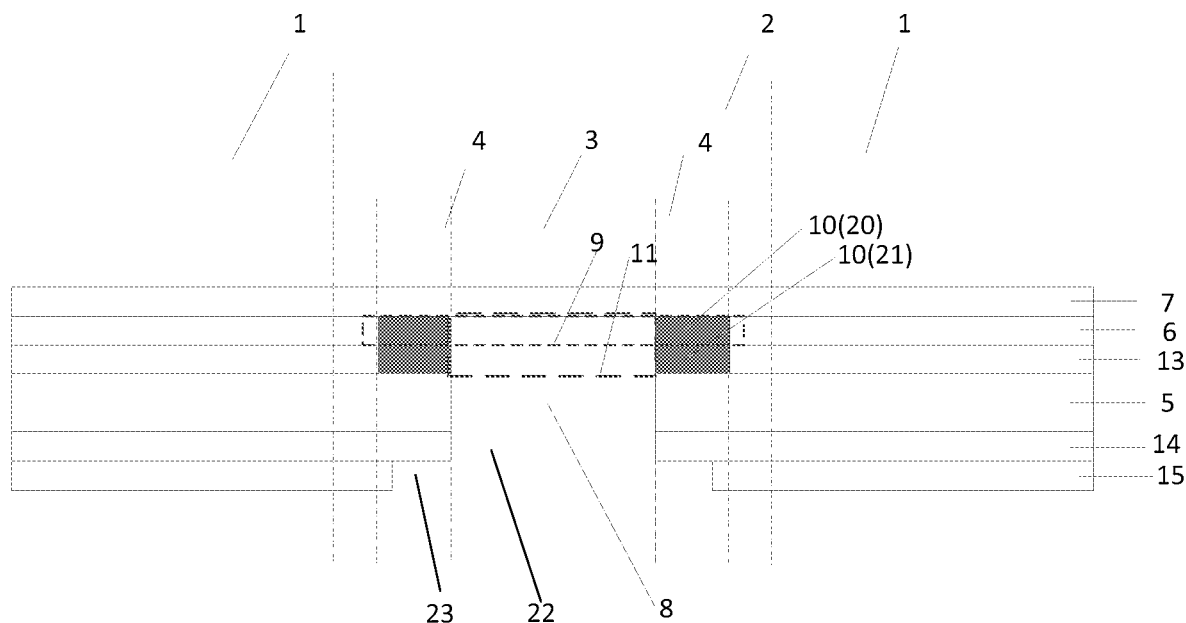
FIG. 4 is a schematic structural diagram of yet further display module provided by an embodiment of the present application.

In some embodiments, as shown in FIG. 4, in the light shading region 4, the light shading part 10 includes: a part of the optical film extending to the light shading region 4 and doped with the photochromic material; and the photochromic material doped in the optical film in the light shading region is in a light shading state.

The part of the optical film extending to the light shading region 4 and doped with the photochromic material is a light-shading optical adhesive 20; and the photochromic material in the light-shading optical adhesive 20 is in a light shading state.

According to the display module provided by the embodiment of the present application, the light shading part includes: the optical film extending to the light shading region and doped with the photochromic material, and the optical film doped with the photochromic material is in the light shading state, thereby playing the good light shading effect, avoiding the light leakage of the edge of the light transmitting region caused by the fact that the UV adhesive needs to consider that the ultraviolet irradiation blackness cannot be excessive, and improving the imaging effect of the photosensitive element of the display product.

It should be noted that the optical adhesive outside the light shading region and the light transmitting light is in a light transmitting state, that is, an opening region of the optical adhesive in a light transmitting state corresponds to a region where the second open pore is located.

During specific implementation, for example, the region doped with the photochromic material is in a transparent state when not being irradiated by the preset illumination, and the region is in a light shading state when being irradiated by the preset illumination, that is, the optical adhesive extending to the light shading region and doped with the photochromic material is irradiated by the preset illumination so as to obtain the light-shading optical adhesive.

It should be noted that in FIG. 4, only the optical adhesive in the light shading region is doped with the photochromic material. During specific implementation, the optical adhesive outside the light shading region and the light transmitting may also be doped with the photochromic material.

In some embodiments, as shown in FIG. 5, the optical adhesive 6 is entirely doped with the photochromic material; and the photochromic material in a region outside the light shading region 4 is in a transparent state.

As shown in FIG. 5, the optical adhesive 6 surrounding the light shading region 4 is doped with the photochromic material; in a region outside the light shading region 4 and the light transmitting region 3, the photochromic material doped in the optical adhesive 6 is in a transparent state; and in the light shading region 4, the photochromic material doped in the optical adhesive 6 is in a light shading state.

In some embodiments, a light transmittance of the optical adhesive in the light shading region is smaller than 5%, and a light transmittance of the optical adhesive outside the light shading region and the light transmitting region is greater than 93%.

In some embodiments, as shown in FIG. 4, the display module further includes: an optical film 13 between the optical adhesive 6 and the display panel 5.

In the light shading region 4, the light shading part 10 further includes: a part of the optical film extending to the light shading region 4 and doped with the photochromic material; and the photochromic material doped in the optical film in the light shading region is in a light shading state.

An orthographic projection of the part of the optical film extending to the light shading region 4 and doped with the photochromic material on the cover plate 7 coincides with an orthographic projection of the part of the optical adhesive extending to the light shading region 4 and doped with the photochromic material on the cover plate 7.

As shown in FIG. 4, the part of the optical film extending to the light shading region 4 and doped with the photochromic material is a light-shading optical film 21; and the photochromic material in the light-shading optical film 21 is in a light shading state; and an orthographic projection of the light-shading optical film 21 on the cover plate 7 coincides with an orthographic projection of the light-shading optical adhesive 20 on the cover plate 7.

According to the display module provided by the embodiment of the present application, the light shading part further includes: an optical film extending to the light shading region and doped with the photochromic material, and the optical film doped with the photochromic material in the light shading region is in the light shading state, thereby increasing the thickness of the light shading part, further improving the light shading effect, avoiding the light leakage of the edge of the light transmitting region caused by the fact that the UV adhesive needs to consider that the ultraviolet irradiation blackness cannot be excessive, and improving the imaging effect of the photosensitive element of the display product.

It should be noted that in FIG. 4, only the optical film in the light shading region is doped with the photochromic material. During specific implementation, the optical film outside the light shading region and the light transmitting region may also be doped with the photochromic material.

In some embodiments, as shown in FIG. 5, the optical film 13 is entirely doped with the photochromic material; and the photochromic material in the region outside the light shading region 3 is in the transparent state.

As shown in FIG. 5, the optical film 13 surrounding the light shading region 4 is doped with the photochromic material; in the region outside the light shading region 4 and the light transmitting region 3, the photochromic material doped in the optical film 13 is in the transparent state; and in the light shading region 4, the photochromic material doped in the optical film 13 is in the light shading state.

In some embodiments, a light transmittance of the optical film in the light shading region is smaller than 5%, and a light transmittance of the optical film outside the light shading region and the light transmitting region is greater than 93%.

In some embodiments, as shown in FIGS. 4 and 5, an orthographic projection of the third open pore 11 on the cover plate 7 coincides with the orthographic projection of the first open pore 8 on the cover plate 7, and the orthographic projection of the first open pore 8 on the cover plate 7 coincides with the orthographic projection of the light transmitting region 3 on the cover plate 7.

It should be noted that a region where the third open pore is located corresponding to a region where the open pore of the optical adhesive is located and corresponding to a region where an open pore of the light-shading optical film is located.

In some embodiments, no matter a solution that the photochromic material is doped on a whole layer or doped partially, a width of the light shading region is, for example, greater than 0.2 mm. The width of the light shading region refers to a distance between one side surface of the light shading region proximate to the light transmitting region and one side surface of the light shading region proximate to the display region. That is, a width of a region of the light shading region doped with the photochromic material is greater than 0.2 mm, thereby meeting a light leakage preventing condition, further preventing size increase of the black edge of the light transmitting region caused by doping, and decreasing a screen-to-body ratio.

According to the display module provided by the embodiment of the present application, the part of the light shading region doped with the photochromic material is irradiated under a preset illumination condition to form the light shading part with the large area, thereby avoiding refracted light from being incident to the light transmitting region. Therefore, there is no need to dispose the ink layer on one side of the cover plate facing the optical adhesive, and thereby reducing an aligning error caused by disposing of the ink layer.

It should be noted that FIGS. 4 and 5 illustrate by taking an example that the optical film includes a polarizer and the polarizer is doped with the photochromic material. During specific implementation, when the optical film further includes optical films with other functions, the optical films with the other functions may also be doped with the photochromic material.

It should be noted that as for the solution that the optical film and the optical adhesive are doped with the photochromic material on the whole layer, it needs to be meet the condition that the doped photochromic material does not discolor under irradiation of environment light where the display product is used, thereby avoiding that the display product cannot be used caused by discoloring of the photochromic material in the display region.

In some embodiments, as shown in FIGS. 4 and 5, the display module further includes: a backing film 14 on one side of the display panel 5 facing away from the optical film 13, and a heat dissipating layer 15 on one side of the backing film 14 facing away from the display panel 5.

In the first non-display region 2, the backing film 14 is provided with a fifth open pore 22 penetrating through its thickness, and the heat dissipating layer is provided with a sixth open pore 23 penetrating through its thickness; and the orthographic projection of the first open pore 8 on the cover plate 7 coincides with an orthographic projection of the fifth open pore 22 on the cover plate 7, and the orthographic projection of the second open pore 9 on the cover plate 7 is smaller than an orthographic projection of the sixth open pore 23 on the cover plate 7.

Based on the same inventive concept, an embodiment of the present application further provides a preparation method of a display module, as show in FIG. 6, including the following.

S101, a display panel is prepared, and an optical adhesive is formed on a light emergent side of the display panel, wherein the display module includes a display region, and at least one first non-display region in the display region; and the first non-display region includes: a light transmitting region, and a light shading region between the display region and the light transmitting region.

S102, in the first non-display region, a first open pore penetrating through a thickness of the display panel is formed, a second open pore penetrating through a thickness of an optical adhesive is formed, a cover plate and the optical adhesive are attached, and a light shading part is formed in the light shading region, wherein an orthographic projection of the first open pore on the cover plate is located in an orthographic projection of the second open pore on the cover plate; the light shading part is provided a third open pore surrounding the light transmitting region; and the light shading part includes a photochromic material in a light shading state, and an orthographic projection of the light shading part on the cover plate at least covers a region, which does not overlap with the orthographic projection of the first open pore on the cover plate, of the orthographic projection of the second open pore on the cover plate.

According to a manufacturing method of the display module provided by the embodiment of the present application, the light shading part including the photochromic material is formed in the light shading region and at the region, which does not overlap with the orthographic projection of the first open pore on the cover plate, of the orthographic projection of the second open pore on the cover plate, and the photochromic material may be black and may exert a good light shading effect. The light shading part surrounds the light transmitting region, that is, the light shading part may perform light shading on a side surface of the light transmitting region so as to prevent light of a display product from being intervened with the photosensitive element, thereby avoiding light leakage of the edge of the light transmitting region caused by the fact that the UV adhesive needs to consider that the ultraviolet irradiation blackness cannot be excessive, and improving an imaging effect of the photosensitive element of the display product. Moreover, a via hole of the display panel is located in the second open pore of the optical adhesive, that is, an area of the second open pore is greater than that of the first open pore. That is, compared with the display panel, the optical adhesive is provided with an inward-sunken structure in the light shading region, and the light shading part makes contact with the optical adhesive at the inward-sunken structure, thereby improving the bonding effect of a light shading layer and a side surface of the via hole, and further improving a light shading effect of the light shading layer.

In some embodiments, in S102, forming the light shading part in the light shading region, specifically includes the following.

Before bonding the cover plate with the optical adhesive, an ink layer is formed on one side of the cover plate and in the first non-display region, wherein the ink layer is provided with an opening region, an orthographic projection of the opening region on the cover plate coincides with an orthographic projection of the light transmitting region on the cover plate, the orthographic projection of the opening region on the cover plate is located in the orthographic projection of the first open pore on the cover plate, and an edge of the orthographic projection of the second open pore on the cover plate is located in an edge, away from the light transmitting region, of an orthographic projection of the ink layer on the cover plate.

After bonding the cover plate with the optical adhesive, a photochromic material is coated on one side of the display panel and the optical adhesive proximate to the light transmitting region, the ink layer in the second open pore and the opening region of the ink layer by adopting a spraying process so as to form a first photochromic material layer and a second photochromic material layer which are of an integrated structure, wherein the photochromic material is in a light shading state when not being irradiated by a preset illumination condition. The first photochromic material layer covers one side of the display panel and the optical adhesive proximate to the light transmitting region, and the second photochromic material layer covers the opening region of the ink layer and the ink layer in the second open pore.

A pattern of the ink layer is taken as a mask to perform ultraviolet irradiation on the photochromic material covering the opening region of the ink layer so as to enable the photochromic material covering the opening region of the ink layer to change from the light shading state to a transparent state.

According to the manufacturing method of the display module provided by the embodiment of the present application, the photochromic material layers are coated on one side of each film layer proximate to the light transmitting region and a surface perpendicular to a side surface of one side of each film layer proximate to the light transmitting region, thereby improving a bonding effect of the photochromic material layers and all the film layer at the open pores, further forming the second photochromic material layer and the first photochromic material layer which are of the integrated structure, further improving the light shading effect, and effectively avoiding the light leakage of the edge of the light transmitting region. Moreover, after coating the photochromic material in the light shading state, the photochromic material in the light transmitting region only needs to be irradiated under the present illumination condition so that the photochromic material is changed from black to be in the transparent state without affecting light transmitting of the light transmitting region.

In some embodiments, before forming the optical film, the method further includes: the optical film is attached on the light emergent side of the display panel.

Forming the optical adhesive on the light emergent side of the display panel, specifically includes: the optical adhesive is coated on one side of the optical film facing away from the display panel.

The preparation method of the display panel further includes: a backing film is attached to one side of the display panel facing away from the optical adhesive, and a heat dissipating layer is attached to one side of the backing film facing away from the display panel.

At the same time of forming the first open pore penetrating through the thickness of the display panel at the first non-display region, and forming the second open pore penetrating through the thickness of the optical adhesive, the method further includes: a fourth open pore penetrating through a thickness of the optical film is formed, a fifth open pore penetrating through a thickness of the backing film is formed, and a sixth open pore penetrating through a thickness of the heat dissipating layer is formed, wherein an orthographic projection of the fourth open pore on the cover plate and an orthographic projection of the fifth open pore on the cover plate coincide with the orthographic projection of the first open pore on the cover plate, and the orthographic projection of the first open pore on the cover plate is located in an orthographic projection of the sixth open pore on the cover plate.

Forming the light shading part in the light shading region, specifically includes: the photochromic material is coated on a side surface of one side of each of the backing film, the display panel, the optical film and the optical adhesive proximate to the light transmitting region to form the first photochromic material layer.

During specific implementation, attaching the optical film includes, for example, attaching the polarizer.

Figure 7:
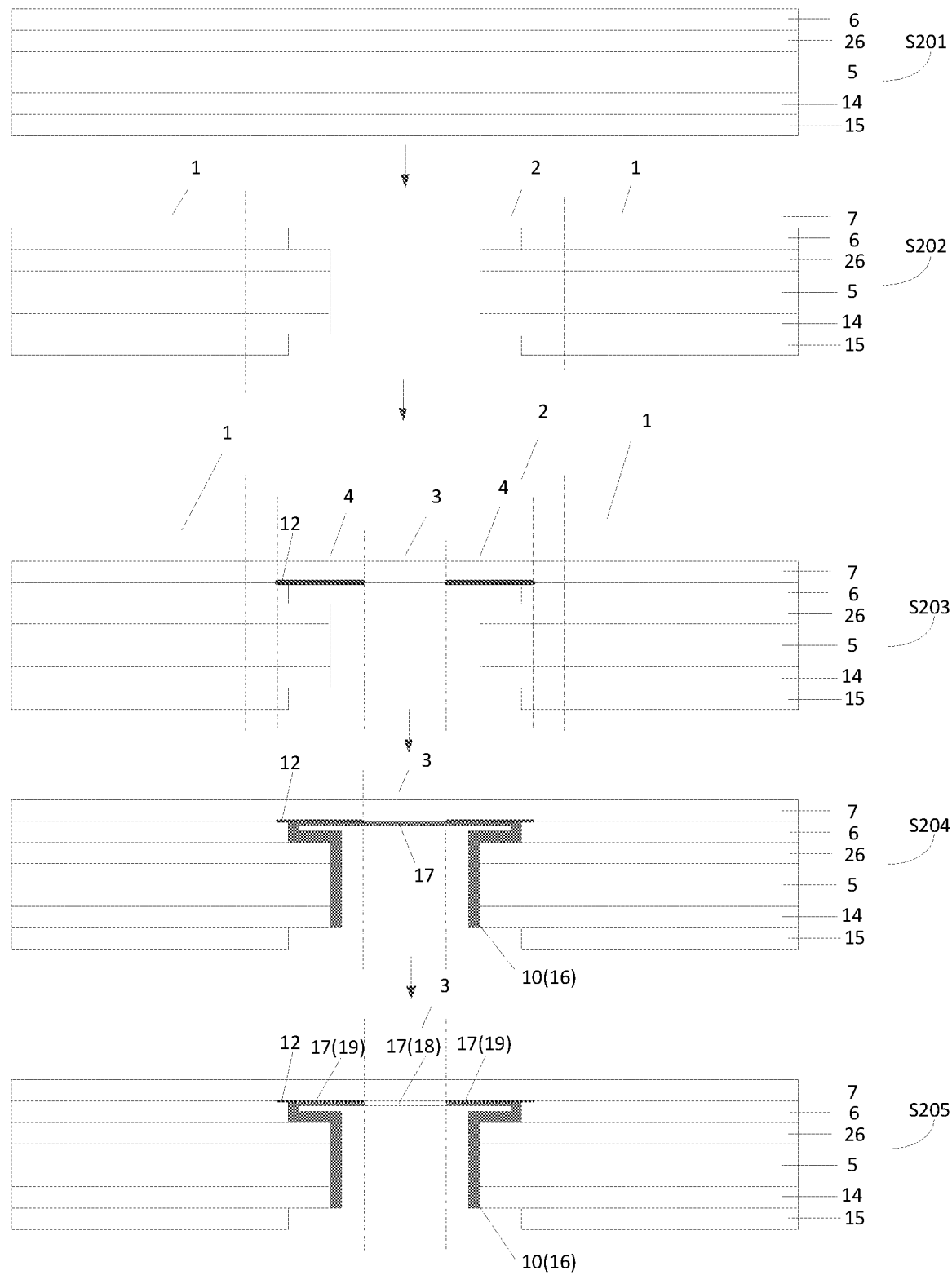
FIG. 7 is a schematic diagram of another preparation method of a display module provided by an embodiment of the present application.

Next, the preparation method of the display module provided by the embodiment of the present application is illustrated by taking an example that the light shading part includes the first photochromic material layer. As shown in FIG. 7, the preparation method of the display module includes the following steps.

S201, a display panel 5 is provided, a polarizer 26 is attached to a light emergent side of the display panel 5, an optical adhesive 6 is coated on one side of the polarizer 26 facing away from the display panel 5, a backing film 14 is attached to one side of the display panel 5 facing away from the light emergent side, and a heat dissipating layer 15 is attached to one side of the backing film 14 facing away from the display panel 5.

S202, a via hole penetrating through a thickness of the optical adhesive 6, the polarizer 26, the display panel 5, the backing film 14 and the heat dissipating layer 15 is formed at a first non-display region 2.

S203, an ink layer is coated on one side of the cover plate 7, and one side of the cover plate 7 coated with the ink layer 12 is attached with the optical adhesive 6.

S204, a photochromic material in a light shading state are coated on one a side surface of one side of the optical adhesive 6, the polarizer 26, the display panel 5, and the backing film 14 proximate to the light transmitting region, a region of the via hole exposed out of the ink layer 12, and an opening region of the ink layer 12 by adopting a spraying process, so as to form a first photochromic material layer 16 and a second photochromic material 17, wherein an orthographic projection of the opening region of the ink layer 12 on the cover plate 7 coincides with an orthographic projection of the light transmitting region 3 on the cover plate 7.

S205, a pattern of the ink layer 12 is taken as a mask to perform ultraviolet irradiation on the second photochromic material layer 17 covering the opening region of the ink layer 12 so as to enable the second photochromic material layer 17 covering the opening region of the ink layer 12 to change from black to be in a transparent state.

Or, the light shading part may also adopt other disposing modes.

For example, in some embodiments, the method further includes: an optical adhesive doped with the photochromic material is formed, and an optical film doped with the photochromic material is formed, wherein the optical adhesive and the optical film at least in the light shading region are doped with the photochromic material; and the doped photochromic material in the light shading region is in a transparent state.

Forming the optical adhesive on the light emergent side of the display panel includes: the optical film is attached to the light emergent side of the display panel; and the optical adhesive is formed on one side of the optical film facing away from the display panel.

Forming a second open pore penetrating through a thickness of the optical adhesive and forming a light shading part in the light shading region, specifically include: the optical adhesive and the optical film at the light transmitting region are removed, the light shading region and the light transmitting region are taken as illumination regions to be irradiated by adopting a preset illumination condition, so as to make the photochromic material doped in the optical adhesive and the optical film in the light shading region be in a light shading state, and make the optical adhesive outside the light shading region and the light transmitting region to be provided with the second open pore.

That is, an opening region of the light transmitting region of the optical adhesive corresponds to a region of the second open pore.

According to the preparation method of the display module provided by the embodiment of the present application, the part of the light shading region doped with the photochromic material is irradiated under the preset illumination condition to form the light shading part with the large area, thereby avoiding refracted light from being incident to the light transmitting region. Therefore, there is no need to dispose the ink layer on one side of the cover plate facing the optical adhesive, and thereby reducing an aligning error caused by disposing of the ink layer. A preparation flow may further be simplified while avoiding the light leakage of the edge of the light transmitting region, and the cost is saved.

During specific implementation, attaching the optical film includes, for example, attaching the polarizer. That is, for example, the part of or all the region of the polarizer may be doped with the photochromic material.

During specific implementation, the photochromic material may be added into a raw material of the optical film or the optical adhesive, and then the optical film or the optical adhesive is formed.

During specific implementation, a doping ratio range of the photochromic material in the optical film or the optical adhesive is 4:1-5:1.

In some embodiments, as for the solution that the optical adhesive extends to the light shading region and is doped with the photochromic material, the method further includes: the backing film is attached to one side of the display panel facing away from the optical adhesive, and the heat dissipating layer is attached to one side of the backing film facing away from the display panel; and a fifth open pore penetrating through a thickness of the backing film is formed, and a sixth open pore penetrating through a thickness of the heat dissipating layer is formed; and an orthographic projection of the fifth open pore on the cover plate coincides with an orthographic projection of the first open pore on the cover plate, and the orthographic projection of the first open pore on the cover plate falls in an orthographic projection of the sixth open pore on the cover plate.

Figure 8:
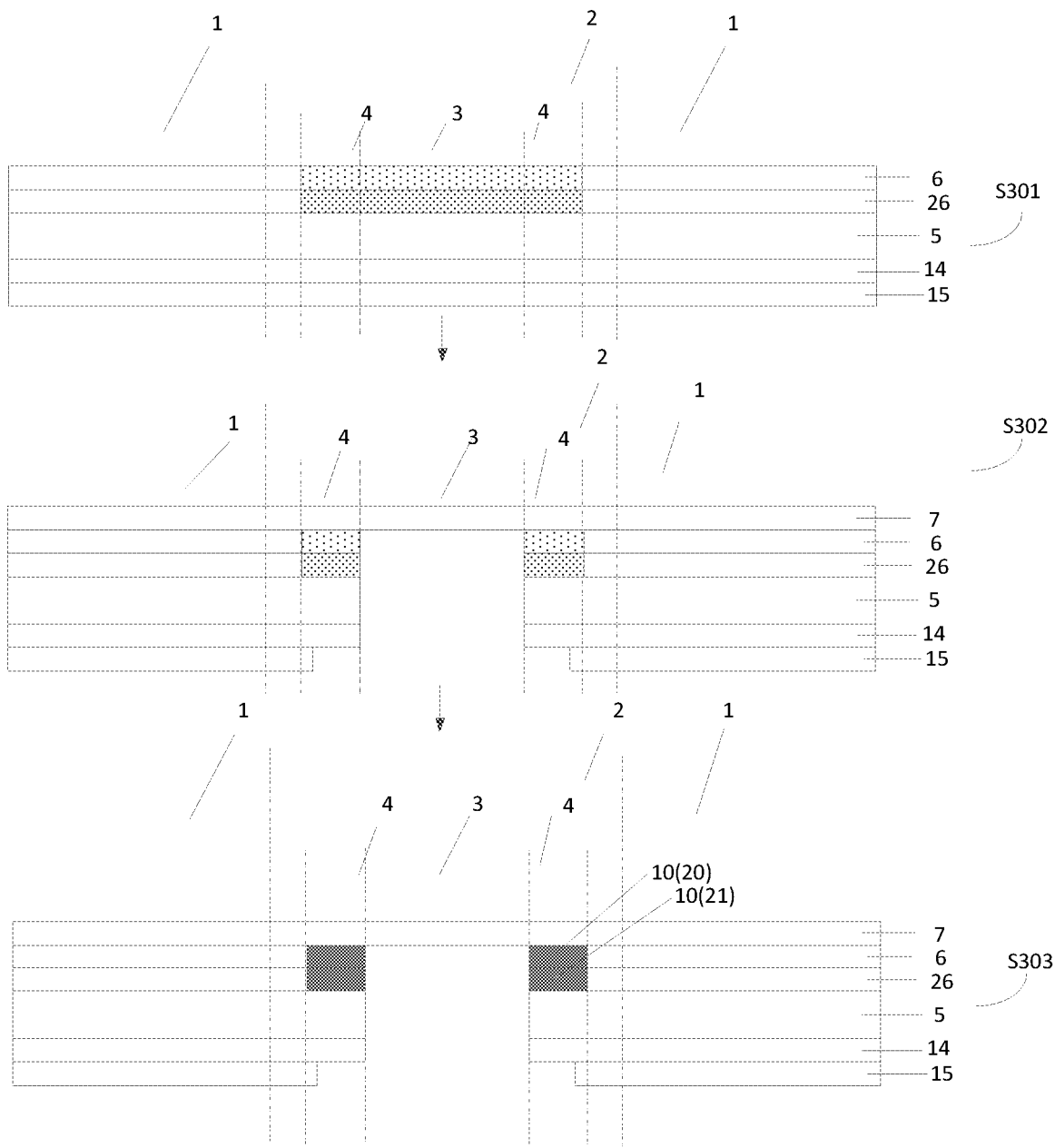
FIG. 8 is a schematic diagram of further preparation method of a display module provided by an embodiment of the present application.

Next, the preparation method of the display module provided by the embodiment of the present application is illustrated by taking an example that the part of the optical adhesive and the part of the polarizer are doped with the photochromic material. As shown in FIG. 8, the preparation method of the display module includes the following steps.

S301, a display panel 5 is provided, the polarizer 26 doped with the photochromic material by adopting a doping process is provided, the optical adhesive 6 doped with the photochromic material by adopting the doping process is provided, the polarizer 26 is attached to a light emergent side of the display panel 5, the optical adhesive 6 is coated on one side of the polarizer 26 facing away from the display panel 5, a backing film 14 is attached to one side of the display panel 5 facing away from the light emergent side, and a heat dissipating layer 15 is attached to one side of the backing film 14 facing away from the display panel 5; wherein the optical adhesive 6 and the polarizer 26 are only doped with the photochromic material at a light shading region 4 and a light transmitting region 3, and the doped photochromic material is in a transparent state.

S302, a via hole penetrating through a thickness of the optical adhesive 6, the polarizer 26, the display panel 5, the backing film 14 and the heat dissipating layer 15 is formed at a first non-display region 2, and one side of the cover plate 7 is bonded with the optical adhesive 6.

S303, the light shading region 4 and the light transmitting region 3 are taken as illumination regions to be subjected to ultraviolet irradiation, so that the photochromic material doped on the optical adhesive 6 and the polarizer 26 in the light shading region 4 is changed from the transparent state to black so as to form a light-shading optical adhesive 20 and a light-shading polarizer 21 respectively.

Figure 9:
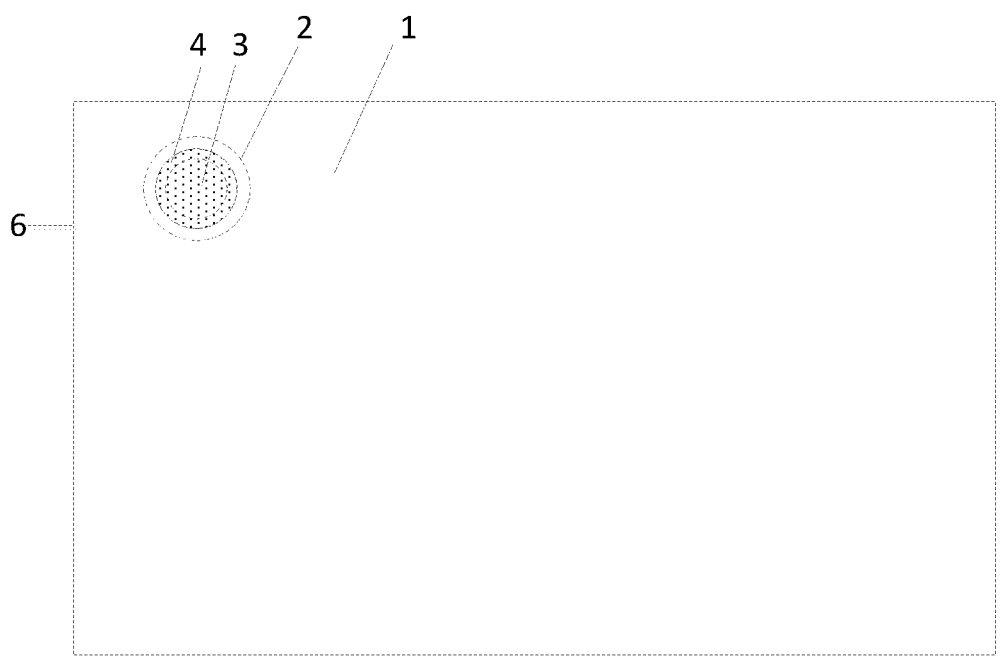
FIG. 9 is a schematic diagram of an optical adhesive in a preparation method of a display module provided by an embodiment of the present application.

It should be noted that in step S301, a top view of the optical adhesive 6 doped with the photochromic material is as shown in FIG. 9. A region doped with the photochromic material in the optical film is consistent with a region doped with the photochromic material in the optical adhesive in FIG. 9, which is not repeated here.

Figure 10:
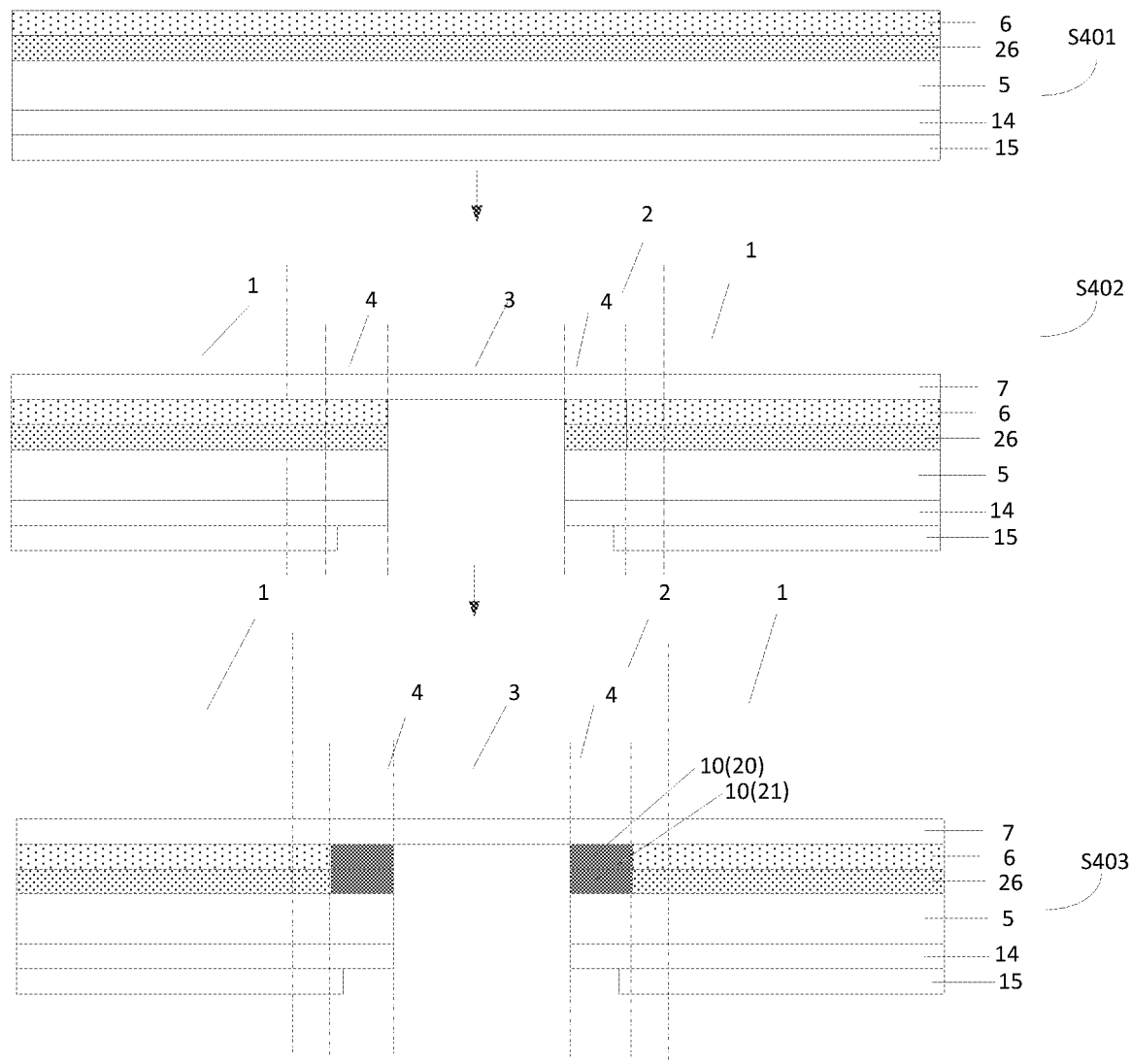
FIG. 10 is a schematic diagram of yet further preparation method of a display module provided by an embodiment of the present application.

Next, the preparation method of the display module provided by the embodiment of the present application is illustrated by taking an example that the optical adhesive and the polarizer are doped with the photochromic material on the whole layer. As shown in FIG. 10, the preparation method of the display module includes the following steps.

S401, a display panel 5 is provided, the polarizer 26 doped with the photochromic material by adopting a doping process is provided, the optical adhesive 6 doped with the photochromic material by adopting the doping process is provided, the polarizer 26 is attached to a light emergent side of the display panel 5, the optical adhesive 6 is coated on one side of the polarizer 26 facing away from the display panel 5, a backing film 14 is attached to one side of the display panel 5 facing away from the light emergent side, and a heat dissipating layer 15 is attached to one side of the backing film 14 facing away from the display panel 5; wherein the optical adhesive 6 and the polarizer 26 are doped with the photochromic material on the whole layer, and the doped photochromic material is in a transparent state.

S402, a via hole penetrating through a thickness of the optical adhesive 6, the polarizer 26, the display panel 5, the backing film 14 and the heat dissipating layer 15 is formed at a first non-display region 2, and one side of the cover plate 7 is bonded with the optical adhesive 6.

S403, the light shading region 4 and the light transmitting region 3 are taken as illumination regions to be subjected to ultraviolet irradiation, so that the photochromic material doped in the optical adhesive 6 and the polarizer 26 in the light shading region 4 is changed from the transparent state to black so as to form a light-shading optical adhesive 20 and a light-shading polarizer 21 respectively.

An embodiment of the present application provides a display apparatus, including the display module provided by the embodiment of the present application, and a photosensitive element, wherein the photosensitive element is in a light transmitting region.

In some embodiments, the display apparatus further includes a backlight module, the display module is on a light emergent side of the backlight module, and at the light transmitting region, the backlight module is provided with an open pore penetrating through its thickness.

In some embodiments, the photosensitive element may be, for example, a camera.

The display apparatus provided by the embodiment of the present application is: any product or component with a display function, such as a mobile phone, a tablet computer, a television, a displayer, a notebook computer, a digital photo frame and a navigator. It should be understood by those ordinary skilled in the art that the display apparatus should have other essential constituent parts, which is not repeated here and may also not be regarded as limitation to the present application. Implementation of the display apparatus may refer to the embodiment of the above display module, which is not repeated here.

In conclusion, according to the display module, the preparation method thereof, and the display apparatus provided by the embodiment of the present application, the light shading part includes the photochromic material, and the photochromic material may be black and may exert the good light shading effect. The light shading part surrounds the light transmitting region, that is, the light shading part may perform light shading on the side surface of the light transmitting region so as to prevent the light of the display product from being intervened with the photosensitive element, thereby avoiding the light leakage of the edge of the light transmitting region caused by the fact that the UV adhesive needs to consider that the ultraviolet irradiation blackness cannot be excessive, and improving the imaging effect of the photosensitive element of the display product. Moreover, the orthographic projection of the via hole of the display panel on the cover plate falls in the orthographic projection of the second open pore of the optical adhesive, that is, the area of the second open pore is greater than that of the first open pore on the cover plate. That is, compared with the display panel, the optical adhesive is provided with the inward-sunken structure in the light shading region, the orthographic projection of the light shading part on the cover plate at least covers the region, which does not overlap with the orthographic projection of the first open pore on the cover plate, of the orthographic projection of the second open pore on the cover plate, and the light shading part makes contact with the optical adhesive at the inward-sunken structure, thereby improving the bonding effect of the light shading layer and the side surface of the via hole, and further improving the light shading effect of the light shading layer.

Obviously, those skilled in the art can make various modifications and variations to the present application without departing from the spirit and scope of the present application. In this way, if these modifications and variations of the present application fall within the scope of the claims of the present application and their equivalent art, the present application also intends to include these modifications and variations.

What is claimed is:

1. A display module, comprising: a display region, and at least one first non-display region in the display region, wherein the first non-display region comprises: a light transmitting region, and a light shading region between the display region and the light transmitting region;
   the display module further comprises:
   a display panel, provide with a first open pore penetrating through its thickness in the first non-display region;
   a cover plate on a light emergent side of the display panel;
   an optical adhesive between the cover plate and the display panel, provided with a second open pore penetrating through its thickness in the first non-display region, wherein an orthographic projection of the first open pore on the cover plate is located in an orthographic projection of the second open pore on the cover plate; and
   a light shading part in the light shading region, wherein the light shading part is provided with a third open pore surrounding the light transmitting region and comprises a photochromic material in a light shading state, and an orthographic projection of the light shading part on the cover plate at least covers a region, which does not overlap with the orthographic projection of the first open pore on the cover plate, of the orthographic projection of the second open pore on the cover plate;
   wherein the light shading part comprises:
   an ink layer on one side of the cover plate facing the optical adhesive; and a first photochromic material layer at least coated on one side of the display panel and the optical adhesive proximate to the light transmitting region;

wherein the ink layer is provided with an opening region, an orthographic projection of the opening region on the cover plate coincides with an orthographic projection of the light transmitting region on the cover plate, the orthographic projection of the opening region on the cover plate is located in the orthographic projection of the first open pore on the cover plate, and an edge of the orthographic projection of the second open pore on the cover plate is located in an edge, away from the light transmitting region, of an orthographic projection of the ink layer on the cover plate;

wherein the display panel further comprises:

a second photochromic material layer on one side of the ink layer facing the optical adhesive:

wherein the second photochromic material layer and the first photochromic material layer are of an integrated structure, and the second photochromic material layer covers the opening region and the ink layer in the second open pore; and a part of the second photochromic material layer covering the opening region is in a transparent state, and a remaining part of the second photochromic material layer is in a light shading state.

2. A display apparatus, comprising: the display module according to claim 1, and a photosensitive element;

wherein the photosensitive element is in a light transmitting region.

3. The display module according to claim 1, further comprising:

an optical film between the optical adhesive and the display panel;

a backing film on one side of the display panel facing away from the light emergent side; and a heat dissipating layer on one side of the backing film facing away from the display panel;

wherein in the first non-display region, the optical film is provided with a fourth open pore penetrating through its thickness, the backing film is provided with a fifth open pore penetrating through its thickness, and the heat dissipating layer is provided with a sixth open pore penetrating through its thickness; and the orthographic projection of the first open pore on the cover plate coincides with an orthographic projection of the fifth open pore on the cover plate, and the orthographic projection of the second open pore on the cover plate is located in an orthographic projection of the sixth open pore on the cover plate.

4. A display module, comprising: a display region, and at least one first non-display region in the display region, wherein the first non-display region comprises: a light transmitting region, and a light shading region between the display region and the light transmitting region;

the display module further comprises:

a display panel, provide with a first open pore penetrating through its thickness in the first non-display region;

a cover plate on a light emergent side of the display panel;

an optical adhesive between the cover plate and the display panel, provided with a second open pore penetrating through its thickness in the first non-display region, wherein an orthographic projection of the first open pore on the cover plate is located in an orthographic projection of the second open pore on the cover plate; and a light shading part in the light shading region, wherein the light shading part is provided with a third open pore surrounding the light transmitting region and comprises a photochromic material in a light shading state, and an orthographic projection of the light shading part on the cover plate at least covers a region, which does not overlap with the orthographic projection of the first open pore on the cover plate, of the orthographic projection of the second open pore on the cover plate;

wherein the light shading part comprises:

a part of the optical adhesive extending to the light shading region and doped with the photochromic material;

wherein the photochromic material doped in the optical adhesive in the light shading region is in a light shading state.

5. The display module according to claim 4, wherein the optical adhesive is entirely doped with the photochromic material; and the photochromic material in a region outside the light shading region is in a transparent state.

6. The display module according to claim 4, the optical adhesive is only doped with the photochromic material in the light shading region.

7. The display module according to claim 5, further comprising:

an optical film between the optical adhesive and the display panel;

wherein the light shading part further comprises: a part of the optical film extending to the light shading region and doped with the photochromic material; and the photochromic material doped in the optical film in the light shading region is in a light shading state; and an orthographic projection of the part of the optical film extending to the light shading region and doped with the photochromic material on the cover plate coincides with an orthographic projection of the part of the optical adhesive extending to the light shading region and doped with the photochromic material on the cover plate.

8. The display module according to claim 7, wherein the optical film is entirely doped with the photochromic material; and the photochromic material in a region outside the light shading region is in a transparent state.

9. The display module according to claim 4, wherein an orthographic projection of the third open pore on the cover plate coincides with the orthographic projection of the first open pore on the cover plate, and the orthographic projection of the first open pore on the cover plate coincides with an orthographic projection of the light transmitting region on the cover plate.

10. The display module according to claim 5, wherein an orthographic projection of the third open pore on the cover plate coincides with the orthographic projection of the first open pore on the cover plate, and the orthographic projection of the first open pore on the cover plate coincides with an orthographic projection of the light transmitting region on the cover plate.

11. The display module according to claim 6, wherein an orthographic projection of the third open pore on the cover plate coincides with the orthographic projection of the first open pore on the cover plate, and the orthographic projection of the first open pore on the cover plate coincides with an orthographic projection of the light transmitting region on the cover plate.

12. The display module according to claim 7, wherein an orthographic projection of the third open pore on the cover plate coincides with the orthographic projection of the first open pore on the cover plate, and the orthographic projection of the first open pore on the cover plate coincides with an orthographic projection of the light transmitting region on the cover plate.

13. The display module according to claim 8, wherein an orthographic projection of the third open pore on the cover plate coincides with the orthographic projection of the first open pore on the cover plate, and the orthographic projection of the first open pore on the cover plate coincides with an orthographic projection of the light transmitting region on the cover plate.

14. The display module according to claim 7, further comprising:
   a backing film on one side of the display panel facing away from the optical film; and
   a heat dissipating layer on one side of the backing film facing away from the display panel;
   wherein in the first non-display region, the optical film is provided with a fourth open pore penetrating through its thickness, the backing film is provided with a fifth open pore penetrating through its thickness, and the heat dissipating layer is provided with a sixth open pore penetrating through its thickness; and
   the orthographic projection of the first open pore on the cover plate coincides with an orthographic projection of the fifth open pore on the cover plate, and the orthographic projection of the second open pore on the cover plate is located in an orthographic projection of the sixth open pore on the cover plate.

15. A preparation method of a display module, comprising:
   preparing a display panel and forming an optical adhesive on a light emergent side of the display panel, wherein the display module comprises: a display region, and at least one first non-display region in the display region; and the first non-display region comprises: a light transmitting region, and a light shading region between the display region and the light transmitting region; and
   forming a first open pore penetrating through a thickness of the display panel in the first non-display region, forming a second open pore penetrating through a thickness of the optical adhesive in the first non-display region, bonding a cover plate with the optical adhesive, and forming a light shading part in the light shading region, wherein an orthographic projection of the first open pore on the cover plate is located in an orthographic projection of the second open pore on the cover plate; the light shading part is provided with a third open pore surrounding the light transmitting region and comprises a photochromic material in a light shading state; and an orthographic projection of the light shading part on the cover plate at least covers a region, which does not overlap with the orthographic projection of the first open pore on the cover plate, of the orthographic projection of the second open pore on the cover plate;
   wherein the forming the light shading part in the light shading region comprises:
   before bonding the cover plate with the optical adhesive, forming an ink layer on one side of the cover plate and in the first non-display region, wherein the ink layer is provided with an opening region, an orthographic projection of the opening region on the cover plate coincides with an orthographic projection of the light transmitting region on the cover plate, the orthographic projection of the opening region on the cover plate is located in the orthographic projection of the first open pore on the cover plate, and an edge of the orthographic projection of the second open pore on the cover plate is located in an edge, away from the light transmitting region, of an orthographic projection of the ink layer on the cover plate;
   after bonding the cover plate with the optical adhesive, forming a first photochromic material layer and a second photochromic material layer of an integrated structure by coating a photochromic material on one side of the display panel and the optical adhesive proximate to the light transmitting region, the ink layer in the second open pore, and the opening region of the ink layer by adopting a spraying process, wherein the photochromic material is in a light shading state when not being irradiated by a preset illumination, the first photochromic material layer covers one side of the display panel and the optical adhesive proximate to the light transmitting region, and the second photochromic material layer covers the ink layer in the second open pore and the opening region of the ink layer; and
   performing ultraviolet irradiation on the photochromic material covering the opening region of the ink layer by taking a pattern of the ink layer as a mask so as to enable the photochromic material covering the opening region of the ink layer to change from the light shading state to a transparent state.

\* \* \* \* \*